(12) United States Patent
Adams et al.

(10) Patent No.: US 9,881,267 B2
(45) Date of Patent: *Jan. 30, 2018

(54) TOOL, NETWORK AND METHOD FOR ASSET DATA UPDATING

(75) Inventors: Douglas B. Adams, Milliken, CO (US); Robert J. Boisselle, Jr., Cypress, TX (US); Tony Patrick Ferris, Fort Collins, CO (US); Wayne L. Parent, Boulder, CO (US)

(73) Assignee: International Business Machines Corporation, Armonk, NY (US)

( * ) Notice: Subject to any disclaimer, the term of this patent is extended or adjusted under 35 U.S.C. 154(b) by 904 days.

This patent is subject to a terminal disclaimer.

(21) Appl. No.: 12/195,586

(22) Filed: Aug. 21, 2008

(65) Prior Publication Data

US 2009/0018957 A1 Jan. 15, 2009

Related U.S. Application Data

(63) Continuation of application No. 09/961,192, filed on Sep. 21, 2001, now Pat. No. 7,493,276.

(51) Int. Cl.
*G06Q 10/06* (2012.01)
*G06Q 10/08* (2012.01)
(Continued)

(52) U.S. Cl.
CPC ...... *G06Q 10/06311* (2013.01); *G01S 5/0027* (2013.01); *G06Q 10/063* (2013.01);
(Continued)

(58) Field of Classification Search
CPC .. G06Q 10/06311; G06Q 10/03; G06Q 10/08; G06Q 10/087; G06Q 20/102;
(Continued)

(56) References Cited

U.S. PATENT DOCUMENTS

| 4,837,811 A | 6/1989 | Butler et al. |
| 5,309,351 A | 5/1994 | McCain et al. |

(Continued)

FOREIGN PATENT DOCUMENTS

| JP | 9187062 A | 7/1997 |
| JP | 11327628 A | 11/1999 |

OTHER PUBLICATIONS

Pavopoulos et al; "A Novel Emergency Telemedicine System Based on Wireless Communication Technology—Ambulance", IEEE Transactions on Information Technology in Biomedicine, vol. 2, No. 4, pp. 261-267, Dec. 1998.

(Continued)

*Primary Examiner* — Asfand Sheikh
(74) *Attorney, Agent, or Firm* — Schmeiser, Olsen & Watts, LLP; Michael Petrocelli

(57) ABSTRACT

A tool, network and method of asset data updating is provided. The tool comprises: a portable computing device capable of wirelessly receiving a GPS location and updating of asset data including, among other things, asset condition and/or GPS location. The tool may also comprise knowledge based software capable of time tracking, work order management and billing. The knowledge based software may be provided alone or in combination with the asset updating. A network capable of wirelessly communicating with the tool is discloses as is a method of using the tool.

2 Claims, 6 Drawing Sheets

(51) Int. Cl.
*G06Q 20/10* (2012.01)
*G06Q 30/02* (2012.01)
*G06Q 40/00* (2012.01)
*G01S 5/00* (2006.01)
*G07C 1/10* (2006.01)

(52) U.S. Cl.
CPC ........... *G06Q 10/08* (2013.01); *G06Q 10/087* (2013.01); *G06Q 20/102* (2013.01); *G06Q 30/0284* (2013.01); *G06Q 40/12* (2013.12); *G07C 1/10* (2013.01)

(58) Field of Classification Search
CPC .. G06Q 30/0284; G06Q 40/12; G01S 5/0027; G07C 1/10
See application file for complete search history.

(56) References Cited

U.S. PATENT DOCUMENTS

| | | | |
|---|---|---|---|
| 5,377,259 A | 12/1994 | Butler et al. | |
| 5,432,841 A * | 7/1995 | Rimer | 455/457 |
| 5,511,108 A | 4/1996 | Severt et al. | |
| 5,521,958 A | 5/1996 | Selig et al. | |
| 5,533,093 A | 7/1996 | Horton et al. | |
| 5,563,607 A | 10/1996 | Loomis et al. | |
| 5,764,693 A | 6/1998 | Taylor et al. | |
| 5,764,726 A | 6/1998 | Selig et al. | |
| 5,844,824 A | 12/1998 | Newman et al. | |
| 5,870,667 A | 2/1999 | Globuschutz | |
| 5,919,239 A * | 7/1999 | Fraker et al. | 701/35 |
| 5,920,846 A | 7/1999 | Storch et al. | |
| 5,930,770 A | 7/1999 | Edgar | |
| 5,931,877 A | 8/1999 | Smith et al. | |
| 6,122,575 A | 9/2000 | Schmidt et al. | |
| 6,129,449 A | 10/2000 | McCain et al. | |
| 6,334,086 B1 | 12/2001 | Park et al. | |
| 6,535,838 B2 * | 3/2003 | Abraham | F23N 1/002 702/183 |
| 6,782,345 B1 * | 8/2004 | Siegel | G06F 11/0733 399/18 |
| 6,961,586 B2 | 11/2005 | Barbosa et al. | |
| 7,005,968 B1 | 2/2006 | Bridgelall | |
| 7,069,333 B1 | 6/2006 | Morris et al. | |
| 2002/0080032 A1 | 6/2002 | Smith et al. | |
| 2002/0156668 A1 | 10/2002 | Morrow et al. | |

OTHER PUBLICATIONS

Broesch et al.; "A Handheld Free Roaming, Data Display for DIII-D Diagnostic Data," 11th IEEE NPSS Real Time Conference, Santa Fe, New Mexico, Jun. 14-18, 1999.

Document Owner: Tony Ferris, IBM Global Services/Lucnest Technologies Technical Assistant Design Specification, (Revised Jun. 14, 2000) Release No. 1.

* cited by examiner

WORK ORDERS

| NUMBER | TYPE | STATUS |
|--------|------|--------|
| 143454 | REPAIR | COMPLETE |
| 14323 | INSTALL | REASSIGNED |
| 22343 | CHECKUP | OPEN |
| 3431 | REPAIR | NEW |

[ADD NOTE] [REASSIGN] [REVIEW]

[CHANGE STATUS] [ASSET DATA/LOCATION] [RESOLVE]

[BACK]

*FIG. 5*

TOOL, NETWORK AND METHOD FOR ASSET DATA UPDATING

This continuation application claims priority to U.S. patent application Ser. No. 09/961,192 entitled TOOL, NETWORK AND METHOD FOR ASSET DATA UPDATING, filed on Sep. 21, 2001 now U.S Pat. No. 7,493,276, the contents of which are hereby incorporated by reference in their entirety.

BACKGROUND OF THE INVENTION

Technical Field

The present invention relates generally to technician assistant tools, and more particularly, to a tool capable of updating asset data such as asset GPS location or asset type, and a related network and method.

Related Art

Field technicians in the service industry receive work orders to service a variety of assets such as equipment, software, etc. The service can be any activity depending on the type of asset. For example, for equipment, service may include installation, maintenance or repair. In one example, an asset may be a part in a telecommunications system. Technicians oftentimes carry portable computing devices, i.e., tools, that are capable of providing a wide variety of functionality to the technician and the service department management. Exemplary functions are: diagnostics for the assets and time tracking software. In their most convenient form, the tools provide wireless communication with a base network.

One problem faced by users of these tools is that advantageous functions are not provided in a single device. For instance, it would be advantageous if time tracking, work order management and billing capabilities could be provided in a single tool.

Another problem often faced by users is finding the asset to be serviced. This is especially a problem where assets are geographically dispersed such as in a telecommunications system. In order to aid users in finding assets, a global positioning system (GPS) can be accessed. For instance, U.S. Pat. No. 5,563,607 to Loomis et al. discloses an event tracking GPS system. Use of the GPS has also been used to track the whereabouts of users. See U.S. Pat. No. 5,844,824 to Newman et al. in which a GPS receiver is placed on a tool.

A problem that occurs when trying to locate an asset is the GPS locator for the asset has been removed, broken or otherwise made inoperable for identifying its assigned asset. Accordingly, an asset and/or its associated GPS location can be misidentified to a user. One exemplary cause of this problem is the switching of a GPS locator from one asset to another. This problem is exacerbated when the two assets are not of the same type, e.g., a printer and a desktop computer. A user sent to service an asset then wastes valuable time and resources traveling to the wrong location.

The task of finding an asset can also be hindered when other information about an asset is incorrect. For instance, when an asset is noted has being next to an object that has been moved, a user may not be able to find the asset. During a technician's workday, he/she oftentimes comes upon assets that: do not have the correct GPS locator, have been moved from their recorded location, have changed in condition such as age, or have other incorrect information recorded about them. In these instances, the user is forced to make a note of the misidentified asset or incorrect condition/information and later correct the data. The corrective measures are oftentimes overlooked or forgotten because of other burdens on the technician. As a result, time wasted searching for an asset is repeated.

In view of the foregoing, there is a need in the art for a tool capable of locating an asset and updating asset data such as GPS location and asset condition. It would also be advantageous if a tool was provided that included knowledge based software capable of combined functions such as time tracking, work order management and billing. A base network capable of managing one or more these tools would also be advantageous.

SUMMARY OF THE INVENTION

A first aspect of the invention is directed to a tool for use with an asset, the tool comprising: a portable computing device; a database located on the portable computing device; a wireless interface adapted for connecting the portable computing device to a network via a wireless access protocol; knowledge base software installed on the portable computing device; a global positioning system (GPS) device attached to the portable computing device; and asset tracking software, installed on the portable computing device, for receiving an asset GPS location via the wireless interface, and for updating asset data via the wireless interface.

A second aspect of the invention is directed to a network for managing a portable computing device used by a user servicing an asset, the network comprising: a wireless interface adapted for communicating with the portable computing device via a wireless access protocol; and asset tracking software for providing asset data including an asset GPS location via the wireless interface to the portable computing device, and for receiving an update of asset data from the portable computing device via the wireless interface.

A third aspect of the invention provides a tool for use with an asset, the tool comprising: a portable computing device; a database located on the portable computing device; means for connecting the portable computing device to a network; means for accessing the database; means, attached to the portable computing device, for determining a global position of the portable computing device; and means for providing an asset GPS location that is received via the means for connecting, and for updating asset data via the means for connecting.

A fourth aspect of the invention provides a tool for use with an asset, the tool comprising: a portable computing device; a database located on the portable computing device; a wireless interface adapted for connecting the portable computing device to a network via a wireless access protocol; and knowledge based software installed on the portable computing device for accessing the database, wherein the knowledge based software includes a time tracking module adapted to track user time, a work order management module adapted to manage work orders and a billing module adapted to generate billing information.

A fifth aspect of the invention is directed to a method of utilizing a tool for use with an asset, the method comprising the steps of: receiving a work order for the asset; receiving asset data for the asset at the tool, the asset data including an asset GPS location; proceeding to the asset based on the asset GPS location; determining whether the asset data is correct; and correcting the asset data where the asset data is incorrect.

A sixth aspect of the invention is directed to a tool for use with an asset, the tool comprising: a portable computing device; a database located on the portable computing device; means for connecting the portable computing device to a network; knowledge based software including: means for tracking time of a user on the tool; means for managing work orders on the tool; and means for generating billing information on the tool; means, attached to the portable computing device, for determining a global position of the portable computing device; and means for providing an asset GPS location that is received via the means for connecting, and for updating asset data via the means for connecting.

The foregoing and other features and advantages of the invention will be apparent from the following more particular description of preferred embodiments of the invention.

BRIEF DESCRIPTION OF THE DRAWINGS

The preferred embodiments of this invention will be described in detail, with reference to the following figures, wherein like designations denote like elements, and wherein:

FIG. 5 shows a display for a work order list of the tool; and

DETAILED DESCRIPTION OF THE INVENTION

Figure 1:
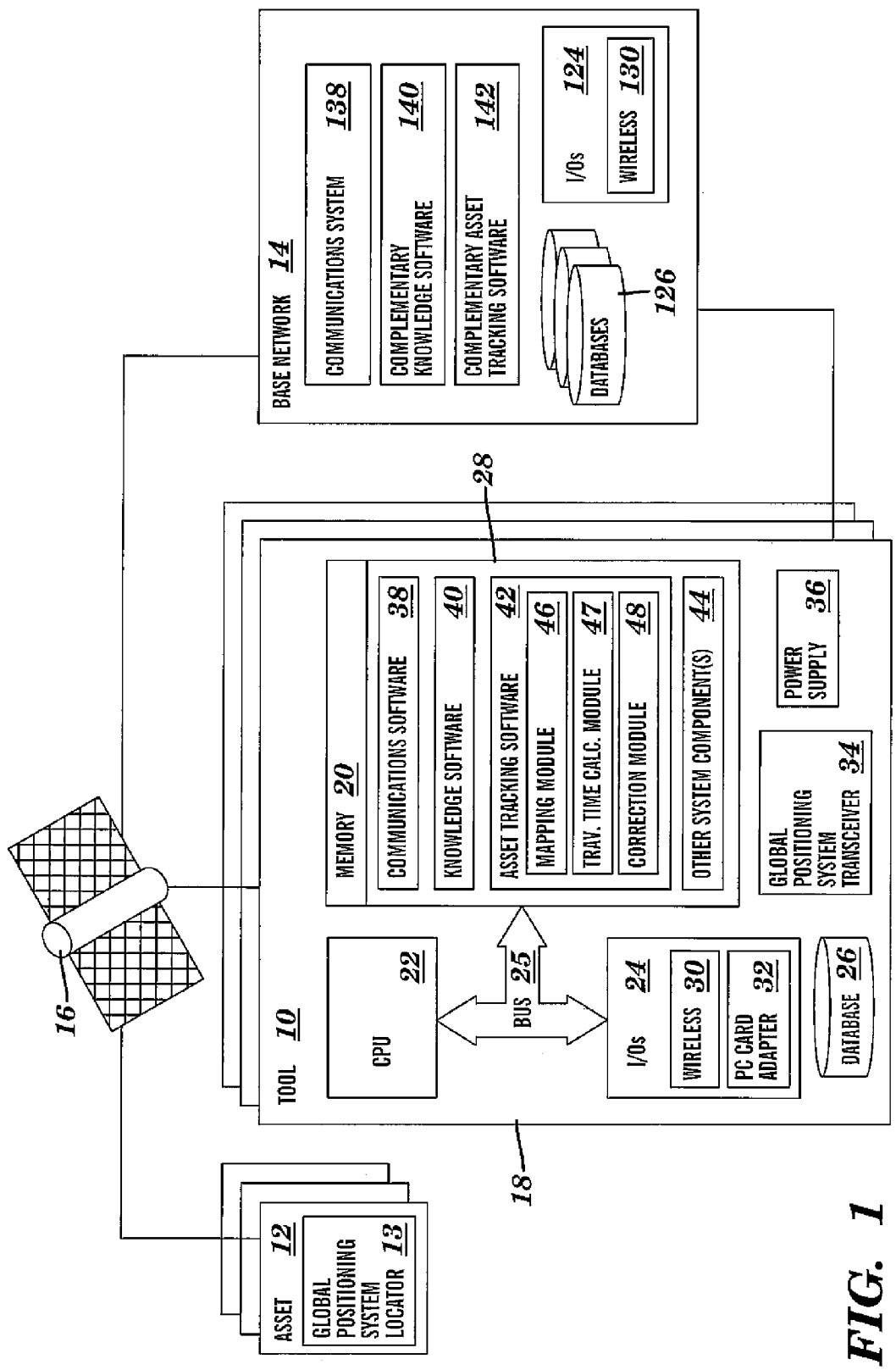
FIG. 1 shows a schematic diagram of a field technician environment including a tool and related network in accordance with the invention.

For convenience purposes only, the description includes the following sections:
I. Environment Overview
II. Tool
III. Base Network
IV. Operation
V. Environment Overview Turning to FIG. 1, a schematic diagram of an environment including a tool 10 for use with an asset 12 is shown. Tool 10 is carried by a user such as a field technician during servicing or acquisition (i.e., tracking and/or locating) of an asset 12 in the field. An "asset" may be any activity, object, individual, or software that may require service or acquisition. Common examples include, inter alia: a switch in a telecommunications system, software on a desktop that is part of a network, another user, a cable TV multiplexor in a cable TV network, an insurance claim activity such as an automobile accident, inventory in a warehouse, etc. In any event, assets 12 may be geographically dispersed.

Tool 10 communicates with a base network 14 where administrative oversight is available. A global positioning system (GPS) 16 is referenced by the above-mentioned components, as will be described below. Each asset 12 includes a GPS locator 13 thereon (or, in the case where asset 12 is software, attached to equipment storing asset 12). Locator 13 may be any device that may be referenced by GPS 16 to determine the geographic location of the associated asset 12. Preferably, locator 13 is fairly small and includes an identification such that a locator-asset assignment can be made.

Tool 10 communicates with GPS 16 and/or base network 14. Base network 14 acts as administrative base for one or more tools 10, i.e., users of tools 10. Base network 14 may be for, for example, a service department administrative headquarters from which a number of technicians are based.

II. Tool

Tool 10 generally includes a portable computing device 18 such as an IBM Workpad®, a PALM Pilot® or similar device that may be commonly referred to as personal digital assistants. Portable computing device 18 includes a memory 20, a central processing unit (CPU) 22, input/output devices I/O 24 and a bus 25. A database 26 may also be provided for storage of knowledge-based information, i.e., information particular to the asset, or group of assets, that the user services. Knowledge-based information may include, for example, technical information regarding asset 12 or diagnostic information. Memory 20 preferably includes a program product 28 that, when executed by CPU 22, comprises various functional capabilities described in further detail below. Memory 20 (and database 26) may comprise any known type of data storage system, including magnet media, optical media, random access memory (RAM), read only memory, a data object, etc.

I/O 24 may comprise any known type of input/output device including a network system, modem, keyboard, mouse, scanner, voice recognition system, CRT, printer, disc drives, etc. One I/O device preferred for tool 10 is a wireless interface 30 adapted for connecting portable computing device 18 to base network 14 via a wireless access protocol. One preferred wireless interface 30 is a PCMCIA compatible card such as available from Research In Motion Corp. Another I/O device preferred for tool 10 is a PC card adapter 32 such as Parachute® by Unilinear Corp.

Tool 10 also includes a GPS transceiver 34 attached thereto such that the geographic location of tool 10 may be determined. Tool 10 also includes a power supply 36 such as a rechargeable battery. Additional components, such as cache memory, etc., may also be incorporated into tool 10.

Figure 2B:
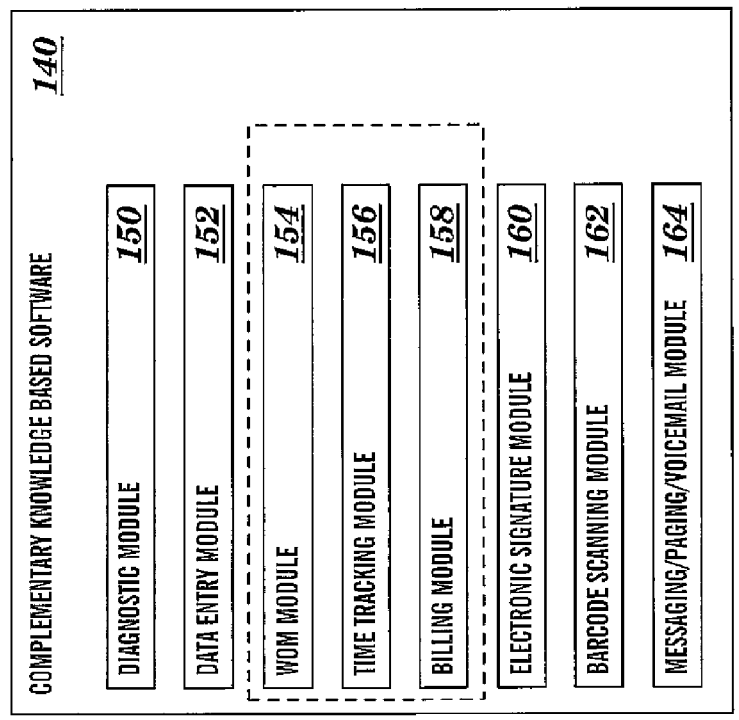
FIGS. 2A-B shows a block diagram of knowledge software used on the assistant tool and related network of FIG. 1.
Figure 2A:
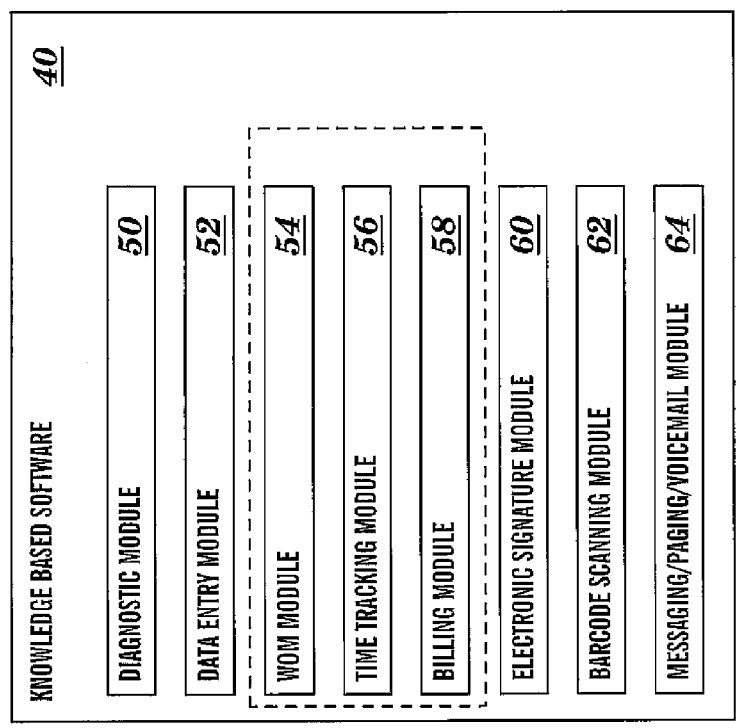

As mentioned previously, memory 20 of tool 10 preferably includes a program product 28 that, when executed by CPU 22, provides various functional capabilities for tool 10. As shown in FIG. 1, program product 28 may include communication software 38, knowledge based software 40, asset tracking software 42, and other system component(s) 44. Other system components 44 may include any other well known portable computing device applications, e.g., personal scheduler, address book, calculator, expense tracking software, games, etc. Communication software 38 may be any well known wireless protocol implementing software. Turning to FIG. 2A, a block diagram of exemplary knowledge based software 40 components is illustrated. Generally, knowledge based software 40 may include any type of knowledge based application(s) used by a user and/or user administrators in servicing one or more assets 12, or accessing database 26 of tool 10 and/or database(s) 126 of base network 14. Generally, knowledge based software 40 will be industry specific. As illustrated, knowledge based software 40 may include:

Diagnostic module 50 adapted to conduct diagnostic tests on asset 12 for analysis. A couple of examples for the telecommunications industry are instructions for a diagnostic test for a telecommunications line and/or the actual test run via tool 10. Diagnostic module 50 may also include means to record and/or analyze results. Furthermore, diagnostic module 50 may include further troubleshooting procedures.

Data entry module 52 for providing a recordation or data collection mechanism where applicable. While data entry module 52 may take a variety of forms, it may also be a simple wordprocessing program such as Lotus WordPro®, Microsoft Word® or Corel Wordperfect®. Work order management (WOM) module 54 for receiving, reading, updating work order (i.e., service tickets) from base network 14. In addition, WOM module 54 may provide a mechanism for reviewing past actions.

Time tracking module 56 for tracking a user's work time. In one embodiment, time tracking module 56 may interact with GPS transceiver 34 to track time based on a user's travel and/or a user's proximity to an asset. For instance, time tracking software may record travel time billable at a given rate, and work time billable at a different rate, based on where a user is located. That is, when the user becomes proximate the asset, time tracking software may changeover from travel time to work time.

Billing module 58 for generating and overseeing billing information such as invoices, receipts, etc. Billing module 58, as is known in the art, may interact with time tracking software 56.

Electronic signature module 60 for collecting signatures from customers and/or transferring this data to base network 14.

Barcode scanning module 62 for scanning a barcode on asset 12 for easy data recall/collection. For instance, in certain industries, assets are tagged with barcodes for easy tracking and data recall/collection. Tool 10 may include an infra-red scanner, as known in the art, and use barcode scanning module 62 to recall/collect information from/for database 26 or database(s) 126.

Messaging/paging/voicemail module 64 for providing a mechanism for the user to receive and send electronic messages and/or verbally communicate with others. Messaging/paging/voicemail software 64 may interact with communications software 38 in a known fashion.

In one embodiment, the invention includes a tool 10 having the combined billing module 58, time tracking module 56 and WOM module 54, which provides a single interactive interface for a user. As an alternative, tool 10 may also include asset tracking software 42, described below.

In view of the foregoing, knowledge based software 40 provides knowledge based application(s) or productivity enhancing functions used by a user in servicing an asset 12 and/or administrators overseeing a number of users. It should be recognized that the list above is not exhaustive. Particular software listed may also be combined and/or customized for industry specific applications.

Asset tracking software 42 is provided to provide a number of asset tracking functions. For instance, asset tracking software 42 receives and updates asset data from base network 14 and/or receives an asset GPS location from GPS 16. For purposes of this disclosure the term "asset data" will be used to refer to any information about an asset 12. For instance, asset data may include: asset type (e.g., printer, computer, automobile accident, telecom switch, etc.); asset model; asset geographic location; asset condition; etc. Asset data is communicated between tool 10 and base network 14 or GPS 16 via wireless interface 30. Asset data is used to locate an asset 12 in the field. In one embodiment, asset tracking software merely provides the asset GPS location and the user determines how best to move to the asset location. In another embodiment, asset tracking software 42 may include a mapping module 46 for providing directions to an asset and/or providing a real-time map. Asset tracking software 42 may also include a travel time calculating module 47 capable of calculating a travel time from a first location, e.g., a user's current location or an asset location, to a second location, e.g., another asset. Using time travel calculating module 47, a user can better schedule his/her workload. In addition, asset tracking software 42 includes an asset data correction module 48 for correcting asset data, as will be described below.

III. Base Network

Base network 14, as recognized in the field, may include one or more networked computers, i.e., servers. In this setting, distributed servers may each contain only one system/module with the remainder of the systems/modules resident on a centrally located server. A server computer typically comprises an advanced mid-range multiprocessor-based server, such as the RS6000 from IBM, utilizing standard operating system software, which is designed to drive the operation of the particular hardware and which is compatible with other system components and I/O controllers. Alternatively, base network 14 may be implemented as part of a workstation such as a personal computer. A workstation of this form may comprise, for example, an INTEL PENTIUM III® microprocessor, or like processor, such as found in an IBM Aptiva® computer.

As shown in FIG. 1, base network 14 includes a communication system 138 compatible with tool 10 communication software 38. Communication system 138 of base network 14 uses, for example, a Netfinity server running IBM Mobile Connect® software which controls data flow to and from the database(s) 126. Base network 14 also includes inputs/outputs (I/O) 124 including, inter alia, wireless interface 130 compatible with that of tool 10. Complementary knowledge based software 140 and complementary asset tracking software 142 to that of tool 10 are provided on base network 14, as necessary. As shown in FIG. 2B, each part of knowledge based software 40 of tool 10 may have a complementary component on base network 14 to record data collected or corrected by tool 10, for retrieving recorded data from database(s) 126 of base network 14, and/or revision of data by a system administrator. Similarly, complementary asset tracking software 142 may retrieve and record asset data or mapping data for asset tracking software 42 of tool 10, as necessary.

IV. Operation

In operation, a user uses tool 10 to service an asset 12 using knowledge based software 40. A user's movement can be tracked by base network 14 based on the tool's GPS transceiver 34 communicating with GPS 16 and/or base network 14. A variety of graphical user interfaces (GUI) can be presented to a user on the display of tool 10. The following discussion will illustrate exemplary GUIs. It should be recognized, however, that the particular GUIs may vary and that other displays, sub-displays, data entry windows, etc., not shown may be implemented as needed to fulfill the operation of tool 10 as described.

Figure 3:
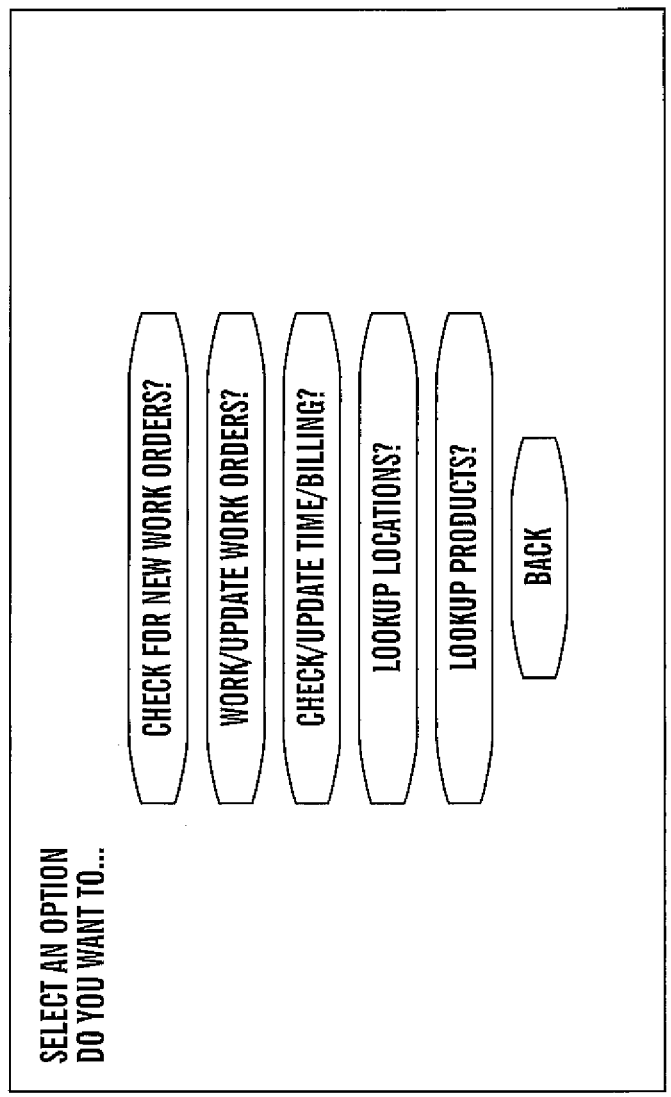
FIG. 3 shows a display for a main menu of the tool.

FIG. 3 illustrates an exemplary main menu GUI for tool 10 including knowledge based software 40 and asset tracking software 42 selections. From the main menu, a user may, for example, choose to Check for New Work Orders; Work/Update Work Orders; Check/Update Time/Billing; Lookup Locations; Lookup Products; etc. Selection of Check for New Work Orders would prompt WOM module 54 to acquire new assignments from base network 14. Selection of Lookup Products would lead to a list (not shown) of products and information about the products such as a diagnostic test, as discussed above relative to knowledge based software 40.

Figure 4:
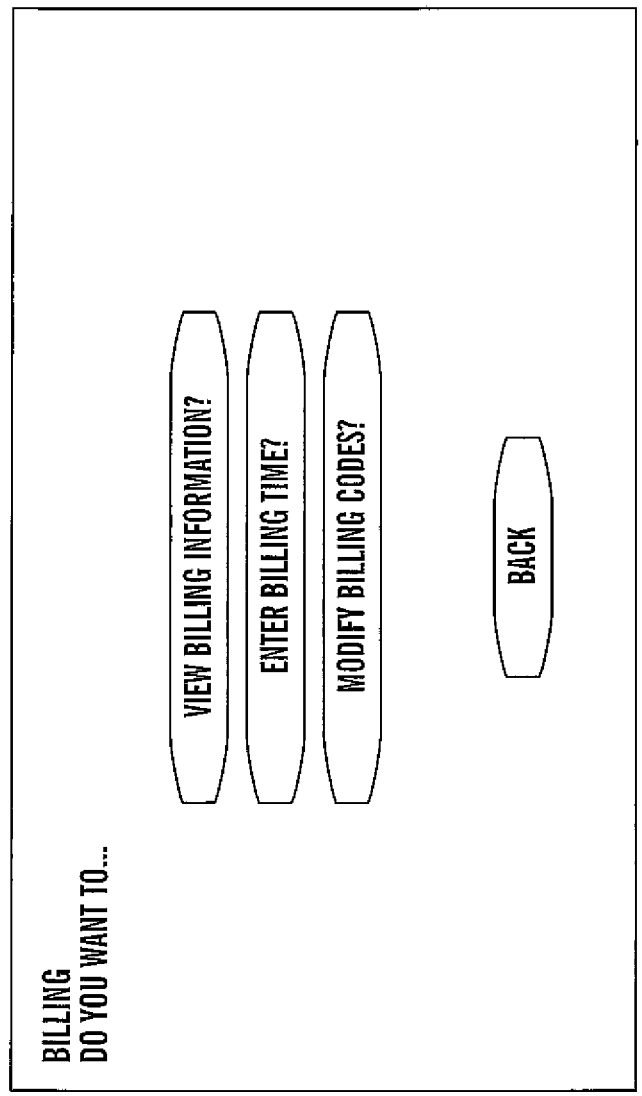
FIG. 4 shows a display for a time/billing menu of the tool.

Selection of Check/Update Time/Billing would prompt time tracking module 56 and/or billing module 58 to display one or more a time/billing menu(s) such as shown in FIG. 4. From this menu, a user may, for example, View Billing Information; Enter Additional Time (if not tracked automatically); Modify Billing Codes; etc. Selection of any of these choices will lead a user to additional menus and/or input windows for time and billing information as known to those with skill in the art.

Selection of Work/Update Work Orders would prompt WOM module 54 to display work orders, as shown in the GUI of FIG. 5, and allow reading and updating of current work orders, and review of past work orders/actions. For instance, a user may be able to select a work order and then Add a Note to a work order, Reassign a work order, Resolve a work order, Change Status of a work order, or Review an old work order. Furthermore, a user may be able to select Asset Data/Location for a work order to receive asset data and directions.

Figure 6:
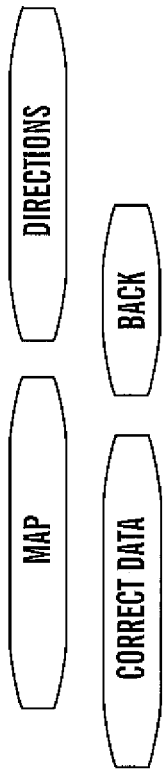
FIG. 6 shows a display for asset data of the tool.

FIG. 6 illustrates an exemplary asset data GUI that would be provided by asset tracking software 42 upon selection of Asset Data/Location. In order to locate an asset 12, in one embodiment, asset tracking software 42 receives asset data including at least an asset GPS location from base network 14, e.g., via complementary asset tracking software 142 accessing database(s) 126. In this case, the asset GPS location may be accessed from GPS 16 on a real-time basis or may be accessed from database(s) 126 in a recorded basis. In another embodiment, asset tracking software 42 receives asset data in the form of an asset GPS location from GPS 16 directly on a real-time basis. Knowing the asset GPS location, a user can determine and travel the most expeditious route to the asset. In addition, if tool 10 is equipped with mapping module 46, the user can be directed to the location of asset 12 on a real-time basis based on his/her position as known from GPS transceiver 34 and the asset GPS location. For example, tool 10 may display a real-time map and provide real-time directions to asset 12 by selection of Map in display of FIG. 6. Systems for implementing such maps and directions are known in the art and will not be discussed here in depth. As also shown in FIG. 6, if asset data is received from base network 14, it may also include information such as asset type, model, and/or condition, which may expedite finding the asset. For instance, in the networking industry, an asset may be a personal computer unit and the condition may be, for example, the color of the unit or its proximity to other notable objects.

As described above, the increased productivity that tool 10 normally provides a user can be damaged when a GPS locator 13 is removed, broken or otherwise inoperable. Another issue is mis-assignment of a GPS locator 13 with an assigned asset, which possibly occurs because of a switching of a GPS locator 13 from one asset to another. This latter issue is magnified when the two assets are not of the same type and a user attempts to visually identify the asset, e.g., when the asset is supposed to be a printer and the GPS locator assigned to the printer is attached to a display screen. In either scenario, a user sent to service an asset wastes valuable time and resources traveling to the wrong location or looking for the wrong asset. During a user's workday, however, he/she is in the best position to correct the above problems, i.e., when he/she comes upon assets that are of an unexpected type or have a changed condition, wrong model or wrong location. In these instances, correction module 48 of asset tracking software 42 may be implemented to update asset data at base network 14. For example, asset tracking software 42 may provide a GUI capable of changing an asset 12 and GPS locator 13 assignment, change an asset's type, model or condition, etc. Asset tracking software 42 may be implemented to correct asset data, for example, by making a Correct Data selection from the asset data GUI of FIG. 6. As user may then, either by entering data on the display of FIG. 6 or using further displays and/or input screens, change the asset data. Once completed, asset tracking software 42 may permanently change asset data as stored on tool 10 and at base network 14. Hence, using asset tracking software 42, a user no longer is forced to make a note of the misidentified asset and later correct the asset data.

Based on the above operation, in one embodiment, the invention includes a method of utilizing a tool for use with an asset 12. The method comprises: receiving a work order for the asset 12; receiving asset data for asset 12 at tool 10 including, inter alia, an asset GPS location, which may be received from one of a GPS and a base network that communicates with the GPS; proceeding to asset 12 based on the asset GPS location; determining whether the asset data is correct; and correcting the asset data where the asset data is incorrect. The step of proceeding to the asset may include following a real-time map provided on the tool and/or determining a travel time to the asset. The steps of receiving may be conducted electronically between tool 10 and base network 14. The asset data may further include at least one of an asset type, an asset model and an asset condition. The step of correcting may include transmitting corrected asset data to base network 14.

As noted above, other GUIs may be provided and the particular GUIs shown may be modified to accommodate other potential knowledge based or asset tracking software functions discussed herein. For instance, GUIs can be provided for diagnostic module 50, data entry module 52, electronic signature module 60, barcode scanning module 62 and messaging/paging/voicemail module 64.

Tool 10 including the above-described knowledge based software and asset tracking software provides a device capable of greatly increasing a user's productivity and efficiency. In the above discussion, it will be understood that the method steps discussed preferably are performed by a processor, such as CPU 22 of tool 10 or a server of base network 14, executing instructions of program product(s) stored in memory. It is understood that the various devices, modules, mechanisms and systems described herein may be realized in hardware, software, or a combination of hardware and software, and may be compartmentalized other than as shown. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after the following: (a) conversion to another language, code or notation; and/or (b) reproduction in a different material form.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A special use portable computing device for use by a service technician to perform a service on a computer-related asset and determine a bill for the service, said special use portable computing device comprising:
   a database;
   an interface for communicating between the portable computing device and the computer-related asset;
   first specialized hardware to perform the service on the computer-related asset via the interface, wherein performing the service on the computer-related asset comprises repairing the computer-related asset, wherein repairing the computer-related asset improves the computer-related asset's functionality, and wherein the computer-related asset is a computer;
   second specialized hardware to scan a barcode on the computer-related asset, to enable retrieval of information about the asset from the database,
   third specialized hardware to receive an electronic signature from a customer associated with the computer-related asset;
   a global positioning system (GPS) device within the portable computing device, wherein the GPS device is configured to obtain a geographical location of the computer related asset from a GPS that is external to the portable computing device;
   fourth specialized hardware to manage asset data pertaining to the computer related asset, wherein the asset data comprises an identification of a first GPS locator which, if referenced by the GPS, provides to the GPS an incorrect identification of the geographical location of the computer related asset due to first GPS locator not being positioned on the computer related asset, and wherein a second, different GPS locator is positioned on the computer related asset;
   fifth specialized hardware to manage display of a graphical user interface (GUI) and to receive via the GUI a directive to change the identification of the first GPS locator in the asset data to an identification of the second GPS locator which, upon being referenced by the GPS, provides to the GPS a correct identification of the geographical location of the computer related asset;
   sixth specialized hardware to generate billing information for the service on the computer-related asset based in part on (a) travel time of the service technician to a location proximate to the computer-related asset, wherein the travel time is based in part on an amount of time for the GPS device to travel to the location proximate to the computer-related asset as determined from tracking the GPS device as the service technician transports the portable computing device to the location proximate to the computer-related asset, (b) work time of the service technician to perform the service on the computer-related asset via the portable computing device and the wireless interface, wherein the work time is based in part on an amount of time that the GPS device is proximate to the location of the computer-related asset as determined from tracking the GPS device as the service technician performs the service on the computer-related asset via the portable computing device, and (c) a time-based billing rate for the travel time and a different, time-based billing rate for the work time;
   seventh specialized hardware to track the travel time until the service technician is the location proximate to the computer-related asset and to switch thereafter to track the work time instead of the travel time;
   eighth specialized hardware to track a GPS location of the computer-related asset by receiving the GPS location of the computer-related asset from the GPS device on a real-time basis and the database on a recorded basis;
   ninth specialized hardware to troubleshoot the computer-related asset;
   tenth specialized hardware to conduct diagnostic tests on the computer-related asset to perform a diagnosis of the computer-related asset;
   eleventh specialized hardware to track the GPS device: (i) as the service technician transports the portable computing device to the location proximate to the computer-related asset and (ii) as the service technician performs the service on the computer-related asset; and
   twelfth specialized hardware to provide a real-time map based on a GPS location of the portable computing device.

2. A method, said method comprising: using a special use portable computing device to perform a service on a computer-related asset and determine the bill for the service, said special use portable computing device comprising:
   a database;
   an interface for communicating between the portable computing device and the computer-related asset;
   first specialized hardware to perform the service on the computer-related asset via the interface, wherein performing the service on the computer-related asset comprises repairing the computer-related asset, wherein repairing the computer-related asset improves the computer-related asset's functionality, and wherein the computer-related asset is a computer;
   second specialized hardware to scan a barcode on the computer-related asset, to enable retrieval of information about the asset from the database,
   third specialized hardware to receive an electronic signature from a customer associated with the computer-related asset;
   a global positioning system (GPS) device within the portable computing device, wherein the GPS device is configured to obtain a geographical location of the computer related asset from a GPS that is external to the portable computing device;
   fourth specialized hardware to manage asset data pertaining to the computer related asset, wherein the asset data comprises an identification of a first GPS locator which, if referenced by the GPS, provides to the GPS an incorrect identification of the geographical location of the computer related asset due to first GPS locator not being positioned on the computer related asset, and wherein a second, different GPS locator is positioned on the computer related asset;
   fifth specialized hardware to manage display of a graphical user interface (GUI) and to receive via the GUI a directive to change the identification of the first GPS locator in the asset data to an identification of the second GPS locator which, upon being referenced by the GPS, provides to the GPS a correct identification of the geographical location of the computer related asset;
   sixth specialized hardware to generate billing information for the service on the computer-related asset based in part on (a) travel time of the service technician to a location proximate to the computer-related asset, wherein the travel time is based in part on an amount of time for the GPS device to travel to the location proximate to the computer-related asset as determined from tracking the GPS device as the service technician transports the portable computing device to the location proximate to the computer-related asset, (b) work time of the service technician to perform the service on the computer-related asset via the portable computing device and the wireless interface, wherein the work time is based in part on an amount of time that the GPS device is proximate to the location of the computer-related asset as determined from tracking the GPS device as the service technician performs the service on the computer-related asset via the portable computing device, and (c) a time-based billing rate for the travel time and a different, time-based billing rate for the work time;

seventh specialized hardware to track the travel time until the service technician is the location proximate to the computer-related asset and to switch thereafter to track the work time instead of the travel time;

eighth specialized hardware to track a GPS location of the computer-related asset by receiving the GPS location of the computer-related asset from the GPS device on a real-time basis and the database on a recorded basis;

ninth specialized hardware to troubleshoot the computer-related asset;

tenth specialized hardware to conduct diagnostic tests on the computer-related asset to perform a diagnosis of the computer-related asset;

eleventh specialized hardware to track the GPS device: (i) as the service technician transports the portable computing device to the location proximate to the computer-related asset and (ii) as the service technician performs the service on the computer-related asset; and twelfth specialized hardware to provide a real-time map based on a GPS location of the portable computing device;

said using the special use portable computing device comprising:

performing, using the first specialized hardware, the service on the computer-related asset via the interface, which repairs the computer-related asset and improves computer-related asset's functionality, wherein the computer-related asset is a computer;

scanning, using the second specialized hardware, the barcode on the computer-related asset to retrieve the information about the asset from the database;

receiving, using the third specialized hardware, an electronic signature from the customer associated with the computer-related asset;

managing, using the fourth specialized hardware, the asset data pertaining to the computer related asset;

managing, using the fifth specialized hardware, display of the graphical user interface (GUI) and receiving via the GUI, using the fifth specialized hardware, the directive to change the identification of the first GPS locator in the asset data to the identification of the second GPS locator;

generating, using the sixth specialized hardware, the billing information for the service on the computer-related asset based in part on the travel time of the service technician, the work time of the service technician, and the time-based billing rate for the travel time and the different, time-based billing rate for the work time;

tracking, using the seventh specialized hardware, the travel time until the service technician is the location proximate to the computer-related asset and switching thereafter to track the work time instead of the travel time;

tracking, using the eighth specialized hardware, the GPS location of the computer-related asset by receiving the GPS location of the computer-related asset from the GPS device on a real-time basis and the database on a recorded basis;

troubleshooting, using the ninth specialized hardware, the computer-related asset;

conducting, using the tenth specialized hardware, the diagnostic tests on the computer-related asset to perform the diagnosis of the computer-related asset;

tracking, using the eleventh specialized hardware, the GPS device: (i) as the service technician transports the portable computing device to the location proximate to the computer-related asset and (ii) as the service technician performs the service on the computer-related asset; and providing , using the twelfth specialized hardware, the real-time map based on the GPS location of the portable computing device.

\* \* \* \* \*